United States Patent [19]

Williams, Jr.

[11] Patent Number: 4,606,549
[45] Date of Patent: Aug. 19, 1986

[54] AUTOMATIC TRAILER HITCH

[76] Inventor: Thomas M. Williams, Jr., Rte. 8, Box 414, Durham, N.C. 27704

[21] Appl. No.: 801,422

[22] Filed: Nov. 25, 1985

Related U.S. Application Data

[63] Continuation-in-part of Ser. No. 674,524, Nov. 23, 1984, Pat. No. 4,560,184, and a continuation-in-part of Ser. No. 699,354, Feb. 7, 1985.

[51] Int. Cl.$^4$ .............................................. B62D 1/16
[52] U.S. Cl. .............................. 280/478 B; 280/477; 280/508
[58] Field of Search ............... 280/508, 510, 504, 511, 280/477, 478 R, 478 B

[56] References Cited

U.S. PATENT DOCUMENTS

| | | | |
|---|---|---|---|
| 2,062,788 | 12/1936 | Jacob | 280/477 |
| 2,671,673 | 3/1954 | Benson | 280/477 |
| 3,161,422 | 12/1964 | Wade | 280/508 |
| 3,329,445 | 7/1967 | Carson | 280/478 B |
| 3,891,237 | 6/1975 | Allen | 280/477 |

Primary Examiner—John J. Love
Assistant Examiner—Donn McGiehan
Attorney, Agent, or Firm—B. B. Olive

[57] ABSTRACT

An automatic trailer hitch assembly mounts a shank unit on the trailer and a receiving unit on the towing vehicle. The shank unit provides an elongated shank member which mounts a trailer ball at one end coupled to a conventional trailer hitch ball socket housing secured to the trailer and at the opposite end is formed to slide on funnel-like guide passages into the receiving unit. A leveler assembly is mounted on the trailing end of the shank unit, releasably grasps the ball socket housing utilizing unsupported weight of the shank unit to establishing the grasping force and retains the shank unit properly positioned for coupling. The leveler assembly automatically releases as the shank unit enters or becomes fully coupled to the receiving unit. The receiving unit has a locking pin which can be latched into a position allowing entry of the shank member into the receiving unit and when the shank unit is properly positioned therein is automatically unlatched and moved into a position for locking the shank unit and receiving unit together. The locking pin can also be restored to a latched position which enables the shank unit to be withdrawn from the receiving unit.

11 Claims, 19 Drawing Figures

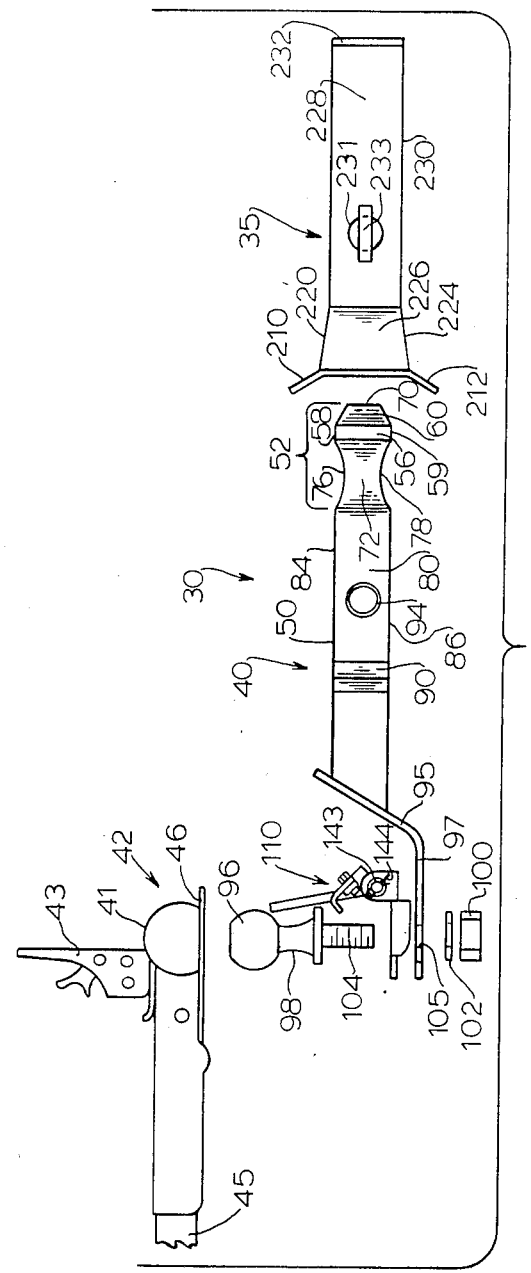
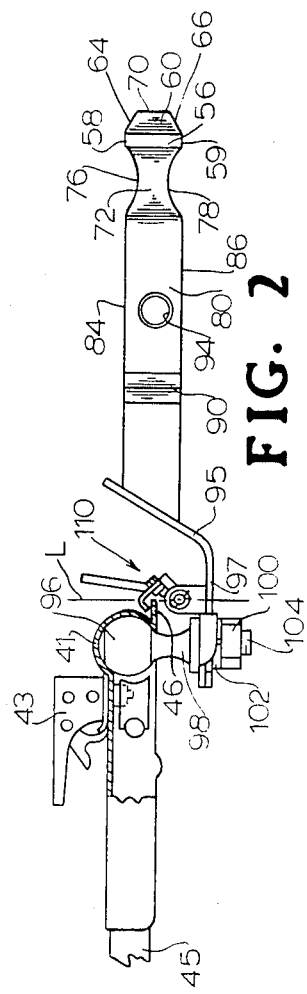
FIG. 1
FIG. 2

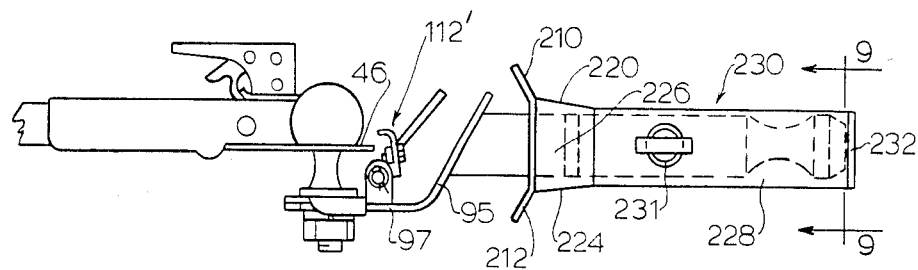
FIG. 8
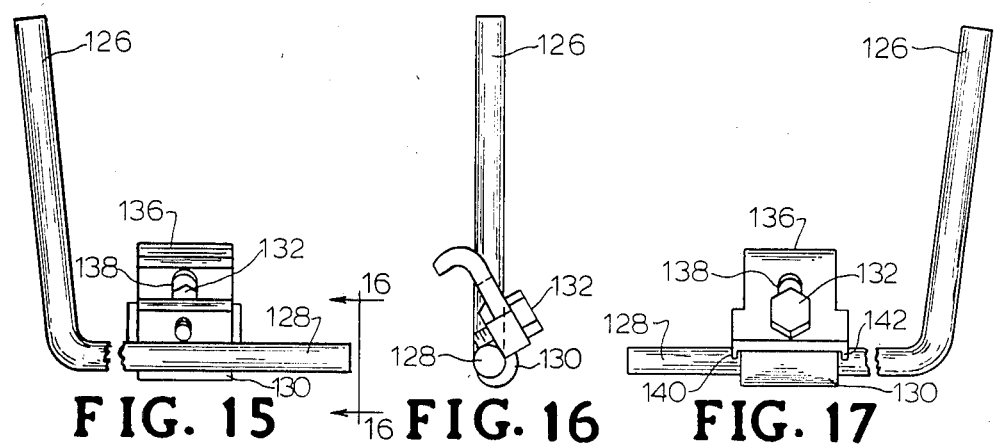
FIG. 15   FIG. 16   FIG. 17
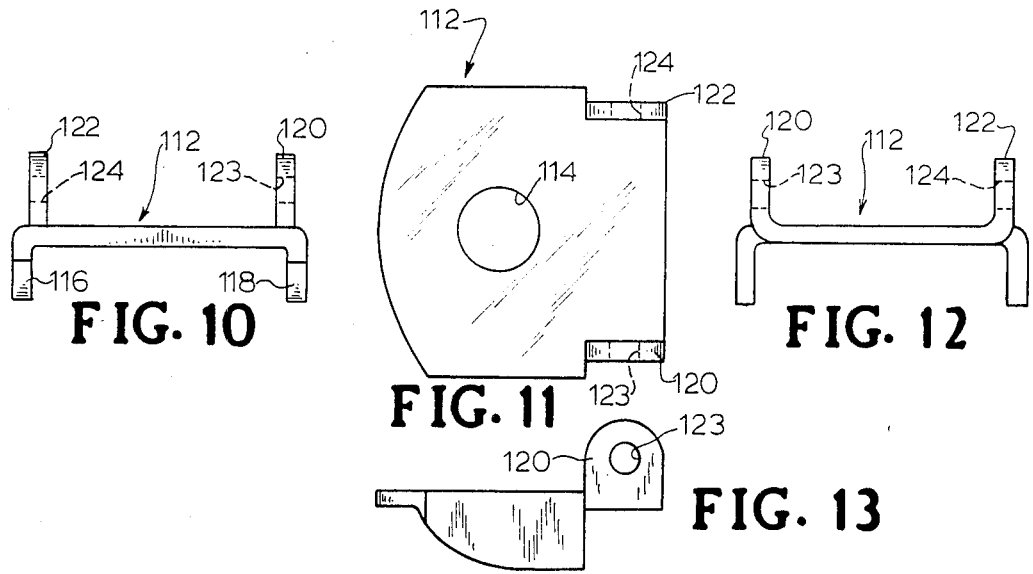
FIG. 10   FIG. 11   FIG. 12
FIG. 13

AUTOMATIC TRAILER HITCH

CROSS-REFERENCE TO RELATED APPLICATION

This application is a continuation-in-part of copending application Ser. No. 674,524, filed Nov. 23, 1984, entitled "Trailer Hitch", now U.S. Pat. No. 4,560,184 and copending application Ser. No. 699,354, filed Feb. 7, 1985, entitled "Self-Coupling Trailer Hitch".

TECHNICAL FIELD

The present invention relates to trailer hitches and particularly to a trailer hitch which automatically couples a recreational or other type trailer to its towing vehicle.

BACKGROUND ART

The most common hitch employed for securing a recreational trailer to a towing vehicle utilizes a trailer ball mounted on the rear of a towing vehicle releasably coupled to a trailer ball socket housing typically mounted on the trailer tongue. When the trailer is small and of light weight, the job of coupling the trailer to the towing vehicle is easily accomplished simply by moving the trailer to the vehicle. However, when a recreational trailer is itself extremely heavy and particularly when it is carrying a heavy load such as a heavy boat or camper, it is normally not practical to attempt to pull the trailer to the towing vehicle for the purpose of coupling the trailer to the vehicle. Therefore, with heavy trailer equipment, the common practice is to support the tongue with an adjustable jack and maneuver the vehicle until the ball and trailer coupler are aligned and suitably positioned for engagement.

A common practice for aligning a towing vehicle with a detached trailer is for one person to monitor the progress of the vehicle towards the trailer while another person operates the towing vehicle. Another practice has been to attach some type of elevated visible marker to the trailer at the location of the trailer ball to assist the driver of the towing vehicle in aligning the vehicle with the trailer and once aligned the driver alone completes the coupling. Appropriately positioned auxiliary mirrors have also been employed. While it is possible for the vehicle driver to carry out this process alone, engagement under these circumstances is difficult since the vehicle driver is normally required to alternate between operating the towing vehicle and monitoring its progress towards the trailer. It would therefore be desirable to provide a trailer hitch which would enable the driver of the towing vehicle to bring the coupling elements of the vehicle and trailer into coupling alignment and also to automatically couple the towing vehicle with the trailer, once so aligned.

Various attempts have been made in the past to provide an automatic trailer hitch. U.S. Pat. No. 2,062,788 discloses a trailer hitch which requires initial alignment of the coupled parts but which will automatically couple after this initial alignment has been accomplished. There is illustrated a tapered shank with a probe for guiding the shank into the bore of a receiving unit. The shank is mounted on the trailer ball which in turn is mounted on the towing vehicle. The receiving unit is mounted on the trailer. Once the shank has been fully inserted into the receiving unit, it is secured by means of lock dogs.

U.S. Pat. No. 2,671,673 discloses a trailer hitch for use with a farm tractor. The tongue of the towed farm implement mounts a flat shank piece with a hole and the draw bar of the tractor mounts both a receiving unit with a wide mouth ramp for guiding the shank and a spring-loaded locking pin which passes through the hole in the shank to complete the coupling. Since the driver of a farm tractor normally has substantially unobstructed vision of the tractor drawbar, it would appear that the tractor hitch illustrated in U.S. Pat. No. 2,671,673 depends on the mentioned shank and ramp being brought into essentially perfect alignment prior to the described automatic coupling operation. When it is desired to uncouple the hitch described in U.S. Pat. No. 2,671,673, it is also necessary that the coupling pin be manually held in a raised position while the tractor moves forward to disengage the trailer from the tractor.

In U.S. Pat. No. 3,891,237 an elongated shank extends rearwardly from the towing vehicle and has one end formed with a socket secured to a ball mounted on the rear of the towing vehicle. The opposite end of the shank has a notch for entering a bell-shaped flange forming part of a receiving unit secured to the tongue of the trailer. The bell-shaped flange guides the vehicle-mounted shank into the trailer-mounted receiving unit and the notch of the shank is automatically received and interlocked with a spring-loaded pawl to complete the coupling. A bolt is illustrated which is manually passed through mating holes formed in the receiving unit and the shank to complete the coupling. The towing vehicle-mounted shank is positioned on the vehicle by means of a spring supported on the rear of the vehicle. This type of hitch requires the receiving unit to be on the trailer and the pawl to be manually held in a raised position when the towing vehicle and the trailer are uncoupled.

An arrangement known in the prior art for facilitating change of hitch size is a square hollow tube receiver fixed to the towing vehicle in which is received a mating manually-installed removable pin secured shank of square cross-section on which a towing ball of selected size is mounted. The ball socket housing on the trailer is brought to the ball on the pin-secured shank after the shank has been installed in its receiver and the ball and socket housing are aligned to effect coupling in a conventional manner. Therefore, this arrangement does not lend itself to automatic coupling.

The described examples are believed sufficient to illustrate the state of the art prior to applicant's invention of the improved hitch described in copending application Ser. No. 674,524 and the need for an improved automatic trailer hitch useful with a standard modern-type of conventional trailer ball coupler. The invention disclosed in copending application Ser. No. 674,524 provides an improved automatic self-coupling type trailer hitch which: (a) employs an adjustably-positioned shank on the towed trailer adapted to be detachably secured to but requiring no modification of the conventional and widely-used recreational metal-formed trailer ball socket housing; (b) employs a receiver unit on the towing vehicle requiring only a one-time installation modification to the towing vehicle on which the receiver unit is mounted; (c) enables the coupling operation to be completed without requiring precise alignment of the trailer-mounted shank and vehicle-mounted receiving unit; and (d) does not require manual holding or positioning of the coupling pin during either the coupling or uncoupling operation.

While the improved self-coupling trailer hitch disclosed in copending application Ser. No. 674,524 met the objectives set forth above, the trailer hitch described in later-filed copending application Ser. No. 699,354 provided an improved spring-loaded locking pin, an improved locking pin support and latching structure, an improved easily removable spring-leveling sub-assembly for the trailer-mounted shank member of the hitch assembly, an improved arrangement on the vehicle-mounted receiving unit for holding the locking pin either fully retracted for withdrawal of the shank and uncoupling of the hitch or partially inserted for the automatic self-coupling operation, and improved means for locking the hitch apparatus, both for safety and anti-theft purposes, and an improved construction in which the trailer hitch is incorporated as a built-in part of a rear bumper such as used on a truck.

With increased use and experience with the trailer hitches of the referred-to copending applications, a need for further improvements has been recognized specifically with regard to eliminating the need for a leveling spring, providing a leveling mechanism which releases itself prior to transit to avoid friction wear on the ball socket housing during transit, simplifying the leveling sub-assembly, providing means for adjusting the degree of level achieved and improving the positiveness of the coupling. The achieving of these improvements thus becomes the principal object of the present invention. Other objects will become apparent as the description proceeds.

DISCLOSURE OF INVENTION

In accordance with the present invention, there is provided a receiving unit mounted on the rear of a towing vehicle and a tapered shank that can be readily attached to the standard coupler ball socket housing on the trailer and which can be guided into the receiving unit for coupling the towing vehicle to the trailer without requiring precise alignment prior to the coupling operation. The receiving unit has a funnel-shaped guide for orienting the leading end of the shank into the bore of the receiving unit when the vehicle is being backed towards the trailer and a spring-loaded locking pin which automatically moves into position to secure the shank within the bore when the coupling has been completed. The locking pin is provided with latching means by which the locking pin can be locked in a position substantially clear of the receiver unit prior to the shank's insertion into the receiving unit but such that the end of the locking pin will be engaged by the shank and will automatically move to a locking position as the shank is guided into a fully-coupled position. The latching arrangement of the present invention also provides means by which the locking pin can be latched in another position such that the locking pin completely clears the receiving unit enabling the hitch to be uncoupled. The latching means also provide improved means by which the locking pin is more positively held in locked position. The shank itself mounts a standard trailer ball at one end so that it can be readily clamped to a standard trailer ball socket housing and utilizes a unique and improved leveling sub-assembly detachably secured by the ball mount and which includes a pivotal grasp or clamp adapted to loosely engage the lip of a standard trailer ball socket housing for supporting the shank in a substantially horizontal or other selected adjustable position appropriate to automatic coupling and to release such lip engagement after coupling has been achieved. To avoid any rubbing engagement between the ball socket housing lip and the levelling sub-assembly grasp thereby eliminating wear of the lip during transit.

BRIEF DESCRIPTION OF DRAWINGS

FIG. 1 is an exploded side elevation view of a conventional partial trailer tongue, ball and ball socket housing with the parts comprising the self-coupling trailer hitch of the invention according to a first embodiment.

FIG. 2 is a side elevation view of a partial trailer tongue with an associated trailer hitch ball socket housing assembled with an auxiliary hitch shank member and shown supported in a horizontal position for coupling according to the invention.

FIG. 8 is a side elevation view of the receiving unit after receiving the shank portion of the invention hitch arrangement in a fully coupled position.

FIG. 10 is a rear end view of the disassembled leveler sub-assembly base plate.

FIG. 11 is a plan view of the leveler sub-assembly base plate.

FIG. 12 is a front end view of the leveler sub-assembly base plate

FIG. 13 is a side elevation view of the leveler sub-assembly base plate.

FIG. 15 is a rear elevation view of the disassembled leveler sub-assembly shaft and grasp mechanism.

FIG. 16 is an end view of the leveler sub-assembly shaft and grasp mechanism taken in the direction of line 16—16 of FIG. 15.

FIG. 17 is a front view of the leveler sub-assembly shaft and grasp mechanism.

BEST MODE FOR CARRYING OUT THE INVENTION

Figure 3:
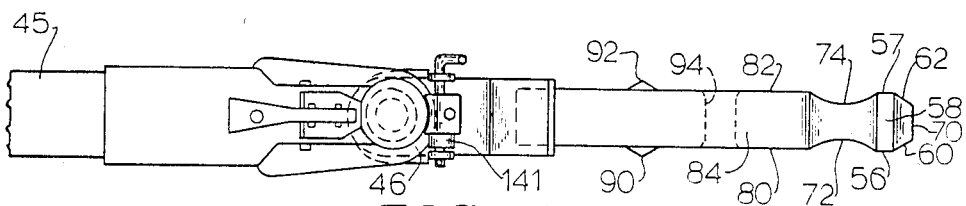
FIG. 3 is a top plan view of the assembly of FIG. 2.
Figure 4:
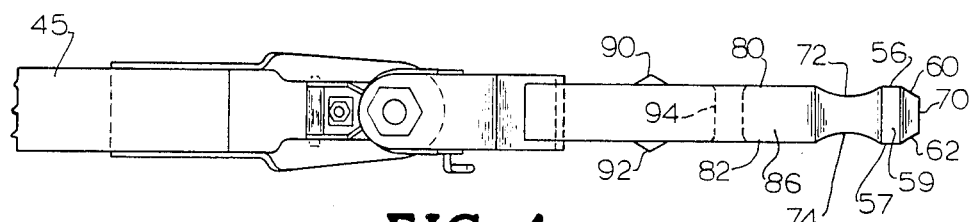
FIG. 4 is a bottom plan view of the assembly of FIG. 3.

Making reference initially to FIGS. 1–16, the first embodiment of the automatic trailer hitch of the invention, generally designated 30, comprises a funnel-shaped receiving unit 35 fixedly attached to a towing vehicle such as a truck, automobile, or the like, and a shank unit 40 coupled to a conventional metal formed ball socket housing 42 mounted on a towed vehicle, such as a recreational boat trailer. Neither the towing vehicle nor the towed vehicle is illustrated for simplification of the drawings. Suitable brackets, not shown, are employed for attaching the receiving unit beneath and to the frame of the towing vehicle using preformed holes 31. It thus may be assumed for purposes of the description that the receiving unit 35 is suitably attached to the towing vehicle and that the particular towed vehicle employed mounts a shank unit 40 as illustrated. In use, the uncoupled receiving unit 35 and shank unit 40 are adapted to be automatically coupled as later explained when the towing vehicle is driven rearwardly to bring the receiving unit 35 into coupling relation with the shank unit 40 as in FIG. 8.

Shank unit 40 comprises an elongated shank 50 formed at its forward end with a probe portion 52 having flat, narrow width, right and left side guide surfaces 56, 57, flat, narow width, top and bottom guide surfaces 58, 59, leading and inwardly-angled, flat, right and left side surfaces 60, 62, leading and inwardly-angled top and bottom flat surfaces 64, 66 and a flat, vertical nose surface 70. Inwardly curved right and left trailing side surfaces 72, 74 and top and bottom curved side surfaces 76, 78 merge into the respective right and left side surfaces 80, 82 and top and bottom surfaces 84, 86 of the shank 50 of square cross section. Such arrangement of surfaces facilitates entry of probe portion 52 into the receiver unit 35 and also prevents any tendency for shank 50 to rotate around its axis within receiving unit 35 of comparable and mating internal square cross sectional shape.

Shank 50 also mounts a pair of opposed stop blocks 90, 92 which serve both to limit the extent of entry of shank 40 into receiving unit 35 and also to accept forces imposed on the hitch during breaking of the towing vehicle. The position of stop blocks 90, 92 are also selected to ensure that shank 50, when fully entered into the receiving unit 35 is located in a proper pin-receiving position for coupling. The vertically-disposed side surfaces 80, 82 and horizontally-disposed top and bottom surfaces 84, 86 forward of blocks 90, 92 smoothly merge into the respective curved surfaces 72, 74 and 76, 78 to further facilitate entry of the shank unit 40 into and withdrawal from the receiving unit 35. A pin-receiving hole 94 having a tapered entrance passes through the width of shank 50 for receiving and guiding the tapered end of a locking pin 96 (FIG. 5) when shank 50 is fully inserted as in FIGS. 8 and 18. Shank 50 may be formed from substantially strong metal tubing or formed as a solid metal piece with stop blocks 90, 92 formed separately and welded or otherwise secured in place or formed integrally with the rest of shank 50.

A bent metal strip ball support 95 secured to the trailing end of shank 50 extends rearwardly and mounts on platform portion 97 utilizing hole 105 a conventional metal trailer hitch ball 96 of some selected size by means of its integral ball mount 98, nut 100 and lock washer 102 secured on the threaded stud 104. Ball 96 is selected to be of the same size as the socket size of the conventional ball socket housing 42 into which the ball 96 is received. Ball mount 98 in association with stud 104, nut 100 and lock washer 102 also secures the later-described leveler sub-assembly 110 on the platform 97 of strip 95.

Ball 96 of the described shank unit 40 mates with and is loosely received by the socket 41 of the conventional type of metal ball socket housing 42 and is retained therein by means of a conventional ball latch 43 as in FIG. 2. Ball socket housing 42 mounts on the end of the trailer tongue 45 as illustrated in FIGS. 1–4 and is characterized by having a forwardly extending ledge 46 which the invention leveler mechanisn 110 utilizes as a clamping ledge for supporting shank unit 40 horizontally prior to coupling utilizing the weight of the outwardly extending shank unit as the clamping force and during which ball 96 is relieved of the shank unit weight.

The leveler sub-assembly 110 includes a plate member 112. Plate 112 is designed to mount on the support platform 97 of FIG. 1 and incorporates a hole 114 mating hole 105 in platform 97 for receiving the ball mount stud 104. Downwardly-extending, laterally-spaced and opposing arms 116, 118 grasp the sides of platform 94 to prevent lateral shifting. A pair of laterally-spaced, vertical bracket arms 120, 122 are formed integral with plate member 112 as are the arms 116, 118. An L-shaped lever 126 incorporates a shaft portion 128 mounted for rotation in holes 123, 124 formed in bracket arms 120, 122. A grasp base member 130 is welded in a central position on shaft 128. A bolt 132 mounts in a suitably-threaded hole 134 in grasp base 130. A grasp 136 having an elongated slot 138 and downwardly-extending retaining arms 140, 142 mounts on and is adjustably secured to grasp base 130. A spacer collar 141 limits lateral shifting of shaft 128 in conjunction with a washer 143 and cotter key 144.

From the foregoing description, it will be seen that the leveler assembly 112 can be installed and removed as a unitary sub-assembly. Leveler assembly 112, once installed as illustrated, in FIG. 2, effectively supports shank unit 40 horizontally to facilitate coupling by using the weight of the outwardly extending shank unit as the clamping force. With ball 96 locked in ball socket 41 as in FIG. 2, grasp 136 is adapted to engage the ledge 46 of the ball socket housing 42 and use the weight of shank unit 40 to maintain the shank unit 40 horizontal or substantially horizontal depending on the adjustment of grasp 136.

Suitable adjustment of grasp 136 with bolt 132 enables the shank unit 40 to be adjusted relative to the ball socket housing 42 and be held in a substantially horizontal or near-horizontal position as required for the particular coupling conditions. The ability of being able to hold shank unit 40 horizontal or near-horizontal is of course highly desirable for being able to effect automatic self-coupling of the shank unit 40 and receiver unit 35 and particularly in view of varying coupling conditions. Furthermore, the coupling between the ball socket housing 42 and the shank unit 40 is such that during the coupling operation, this shank unit 40 can if not precisely aligned with the receiver unit 35 move to the right, to the left, up or down, while achieving the coupling operation. It will also be seen from further description that during travel the hitch of the invention after grasp 136 releases operates advantageously like any conventional ball socket-type hitch. From the description of shank unit 40, the description next turns to a more detailed description of the receiving unit 35 and which repeats much of the description previously set forth in co-pending application Ser. No. 699,354.

Figure 7:
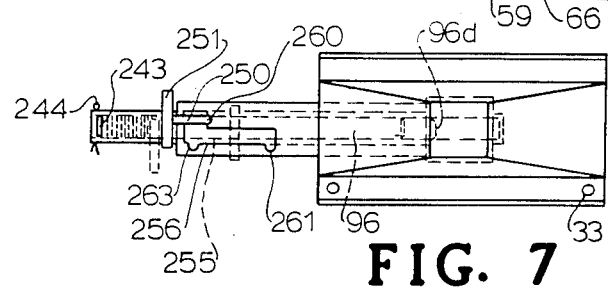
FIG. 7 is a front end elevation view of the receiving unit with the locking pin and lever in dashed lines in a fully withdrawn position, also in dashed lines in a closed or locked position and in solid lines in a partially withdrawn open position preparatory to coupling.

Receiving unit 35 is secured by suitable bumper and chassis brackets, now shown, to the particular towing vehicle being employed. Since trucks, passenger vans, passenger cars and passenger station wagons vary substantially in the types of bumper and chassis constructions employed and all are employed for towing recreational trailers, it will be understood that the manner of mounting may vary from vehicle to vehicle. Also, the size and shape of the receiving unit 35 may conform to the particular vehicle. The invention also contemplates that the receiving unit 35 may be made a part of a conventional bolt-on under car or under truck receiver or made part of the rear bumper itself as previously described in copending application Ser. No. 699,354. In use, ball 82 typically resides just behind the rear bumper of the vehicle. Safety chains may be employed using holes 33 (FIG. 7).

Making reference especially to FIGS. 5-8 and to the construction and operation of receiving unit 35, there is provided an integral funnel-like entry structure for receiving and guiding the probe portion 52 of shank unit 40 comprising upper entry ledge 210, lower entry ledge 212, upper slide wall 220, lower slide wall 222, left slide wall 224, and right slide wall 226. The described entry structure merges into a hollow channel 230 with locking pin receiving passage 231 defined by opposing holes formed in the side walls 228, 229 of receiver unit 35. Chanel 230 is closed by a welded-on end plate 232 and has a cross-sectional shape conforming to the size and cross-sectional shape of probe portion 52 and shank 50 and in the illustrated preferred embodiment has an internal square cross-sectional shape for loosely receiving the mating square cross-sectional external shape of shank 50 in the portion of shank 50 immediately forward of stop blocks 90, 92 in a loose nested relation as in FIG. 9.

Figure 5:
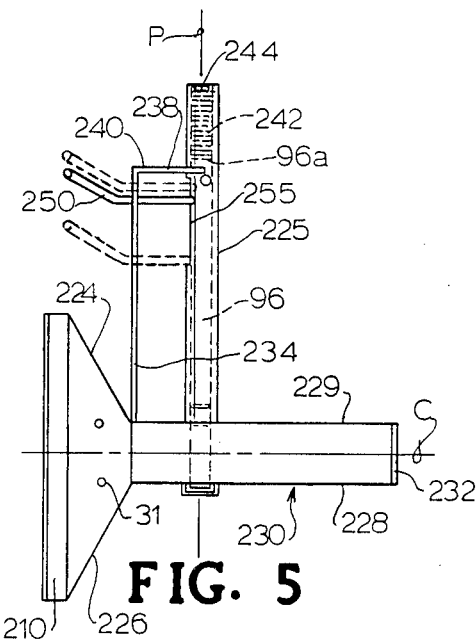
FIG. 5 is a top plan view of the receiving unit of the invention removed from the towing vehicle on which it is mounted with the locking pin and lever arrangement illustrated in solid lines in an open position preparatory to coupling position, in dashed lines in a closed or locked position after coupling and also in dashed lines a fully withdrawn position.
Figure 6:
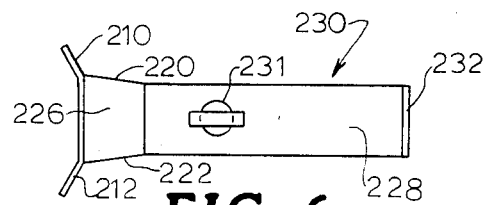
FIG. 6 is a side elevation view of the receiving unit of FIG. 5 removed from the vehicle on which it is mounted.
Figure 9:
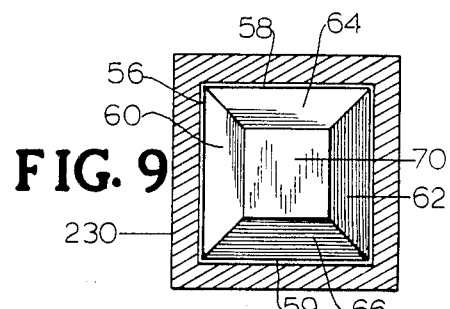
FIG. 9 is an elevation view of the front end of the shank unit in the receiving unit taken along line 9—9 of FIG. 8.

Locking pin 96 is guided by means of a metal tube 225 formed with slot 255 and welded to one side of channel 230 with its axis P oriented perpendicular to the channel axis C. An L-shaped metal frame 240 extends laterally outwardly from the side wall 229 (FIG. 5) on which pin guide tube 225 is mounted providing side section 234, and end section 238. A compression spring 242 mounts within tube 225 held between the outer end 96a (FIG. 5) of pin 96 and a thrust washer 243 held by cotter pin 244 mounted in holes formed in the outer end of tube 225. As best illustrated in FIG. 5, pin 96 is formed as a solid cylindrical member sized to slide freely in tube 225 and mounts a locking pin lever 250 to the locking pin 96. To prepare for coupling, lever 250 is cocked in notch 260. The outer end surface 96d of locking pin 96 is tapered so as to ride on the surface 57 of shank unit 40 when shank unit 40 is being coupled to the receiving unit 35. This arrangement causes pin 96 to shift outwardly as its end surface rides on surface 57. Such action in turn causes lever 250 to leave notch 260 which allows pin 96 and lever 250 to move to the fully-coupled position of FIG. 8. Lever 250 automatically drops into the retaining notch 261.

Lever 250 when released slides back and forth in slot 256 formed in side section 234 of frame 240. Lever 250 is held in a cocked position for coupling as previously mentioned by being placed as indicated in FIG. 7 in the notch 260 extending outwardly from slot 256 formed in section 234 of frame 240. For uncoupling in which the outer end 96d of pin 96 is completely clear of the travel of shank unit 40 on receiver unit 35, lever 250 is cocked in a more outwardly-positioned notch 263. Travel of pin 96 is limited both by welded-on bracket 233 and by the length of slot 256.

When lever 250 is in the cocked position for coupling, the leading end 96d of pin 96 is located just slightly within the internal passage provided by channel 230 as seen in FIG. 8. The probe portion 52 on shank unit 40 is guided, as the towing vehicle is backed, into the described funnel-shaped entry and works its way into channel 230. When probe portion 52 comes into contact with the slightly protruding end 96d of pin 96 in channel 230, lever 250 is automatically released from its cocked position in upper notch 260 and by means of the tension spring provided by spring 242 is pressed into sliding contact with the side surfaces 62 and 57 and, simultaneously with stop blocks 90, 92 reaching their proper position, pin 96 is mated with the hole passageway 94 passing through shank 50 such that it can become fully engaged as shown in FIG. 8.

In order to uncouple the shank unit 40 from the receiving unit 35, lever 250 is latched in lower notch 263 and is cocked into the uncoupling position illustrated in FIG. 7 in dashed lines which causes pin 96 to be fully retracted and clear of the travel of shank unit 40. As the towing vehicle moves away, the shank unit 40 is freely withdrawn from the receiving unit 35 leaving lever 250 latched in lower notch 263. After the uncoupling is completed, lever 250 may be manually released from lower notch 263 and pin 96 allowed to slide to the coupled position to relieve tension on spring 242.

Of particular significance to the present invention is that prior to coupling the unsupported weight of shank unit 40 is applied to grasp 136. However, once the shank unit 40 is fully coupled and supported in receiving unit 35 or during the course of such coupling lever arm 126 by its weight and orientation with respect to grasp 136 tends to rotate and move grasp 136 out of engagement with ledge 46 of the ball socket housing 42. The location of shaft 128 relative to grasp 136 and the orientation of lever 126 are thus selected with this function in mind. Thus, in transit grasp 136 does not rub against or tend to wear ledge 46 and the overall hitch functions like the conventional ball and socket-type hitch. However, once uncoupled, the invention trailer hitch shank unit 40 is easily restored to the desired horizontal position for coupling by simply resetting grasp 136 to the FIG. 2 position by manual use of lever arm 126.

While the type self-releasing leveler sub-assembly just described has been found particularly useful for light weight hitches, the invention also provides in a second embodiment means for positively effecting such release when the shank unit 40 is particular heavy.

Figure 18:
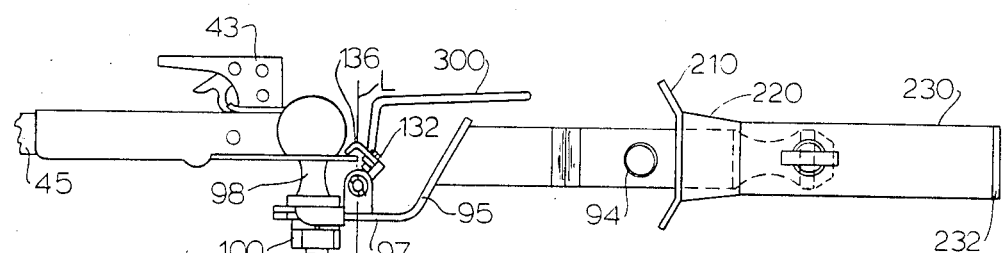
FIG. 18 is a side elevation view of a conventional partial trailer tongue, ball and ball socket housing with the parts comprising the self-coupling trailer hitch of the invention according to a second embodiment utilizing a modified leveler sub-assembly and showing the shank unit partially inserted in the receiving unit.
Figure 19:
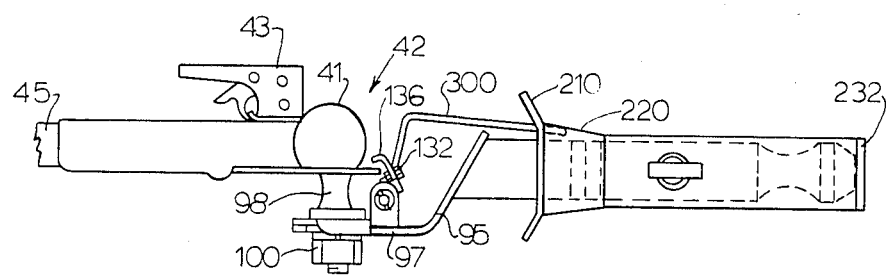
FIG. 19 is a side view of the trailer hitch of FIG. 18 illustrating the lever arm releasing the grasp from engagement with the ball socket housing as the shank unit is fully inserted in the receiving unit.
Figure 14:
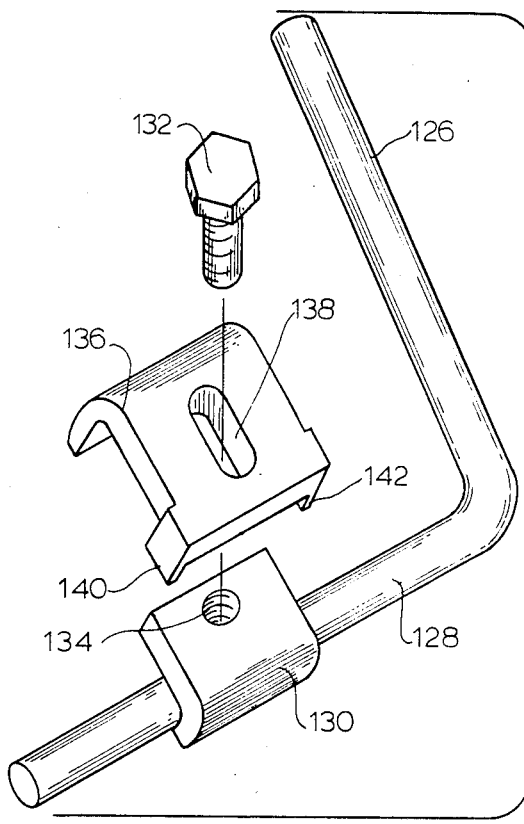
FIG. 14 is an exploded view of the lever grasp-clamp assembly forming part of the leveler sub-assembly.

Referring next to FIGS. 18 and 19, there is illustrated a modified leveler sub-assembly 112' identical to leveler sub-assembly 112 except for having an extended arm 300 adapted to strike the receiver unit slide surfaces 210 and 220 and thereby positively and automatically disengage the grasp 136 from the ball socket housing ledge 46 during coupling as shown in FIG. 19.

In FIGS. 2 and 18, it will be noted that shaft 128 resides in a plane substantially parallel to ledge 46, is located below the level of ledge 46 and is substantially vertically aligned with the clamping portion of grasp 136 along vertical reference line L. This particular physical arrangement has proven effective for insuring that the weight of the shank unit 40 which becomes supported on ledge 46 acts as an effective clamping force on grasp 136 and that shank unit 40 maintains its desired position prior to coupling.

From the foregoing, it can be seen that the improved trailer hitch of the invention, in all of the described embodiments, preserves use of the following advantages of the trailer hitch constructions of the prior copending applications:

(1) Adapts a conventional trailer ball socket coupling to an easily installed and removed automatic hitch without requiring that the trailer coupling be modified.

(2) Operates automatically to couple the trailer and towing vehicle.

(3) Eliminates the need, during the final coupling operation, to either manually align or precisely align the trailer and towing vehicle coupling units to achieve automatic coupling.

(4) Provides a hitch which can be manually latched in a disengaged position on the towing vehicle and then automatically coupled or uncoupled by the driver alone without requiring other assistance.

(5) Provides a hitch which when coupled locates the trailer ball socket housing and the trailer ball immediately adjacent the rear of the towing vehicle for effective weight balance.

(6) Allows the shank unit to be installed in locked position in the receiving unit and have the clamping mechanism removed from the shank unit so as to present a conventional type of vehicle ball mount on the rear of the towing vehicle for conventional non-automatic coupling to the conventional ball socket housing.

(7) Provides means for the shank unit to be moved to some preselected, forwardly-directed position, normally horizontal or near horizontal, to facilitate automatic coupling for the particular coupling condition.

(8) Provides means for distributing the braking load between the locking pin and the stop blocks.

(9) With the shank removed when the trailer is not being pulled, there is essentially no protrusion from the rear of the vehicle as with conventional fixed ball mounts which can easily injure or bruise the leg if accidentally struck.

(10) Provides for handicapped and elderly individuals a means for eliminating the normally heavy lifting and shifting of recreational trailers.

(11) Provides an easily removable, leveler sub-assembly for leveling the shank unit of the invention thus enabling the invention automatic coupling hitch assembly to be quickly converted to a non-automatically coupling and conventional type of hitch simply by installing the invention shank unit in a coupled position, removing the invention leveler sub-assembly and using the ball and socket connection in a conventional way.

(12) By adjusting the leveler sub-assembly allows the shank to be held either horizontal, angled downwardly or angled upwardly to accommodate to a range of coupling conditions.

(13) Allows the conventional ball-socket relation of the coupling to operate in a normal way with the leveler sub-assembly installed.

(14) Adapts to both light duty as well as heavy duty hitch requirements.

Additionally, the following new advantages are recognized.

(15) In particular, provides a leveler assembly which uses the ball socket housing ledge to support the shank unit and which releases itself from engaging the ball socket housing ledge during transit thereby avoiding wear on both the ledge and the leveler grasp.

(16) Provides a substantially simpler leveler assembly which depends solely on the ledge supported weight of the shank unit to establish the clamping force thereby avoiding the need for a leveler spring.

(17) Provides an improved leveler assembly which can be easily manufactured and installed as a sub-assembly.

(18) Provides a shank unit which if desired could be molded as an integral unit ready for installation of the pivotal clamping member.

(19) Provides a receiver unit which if desired could be molded as an integral unit ready for installation of the locking mechanism.

What is claimed is:

1. An automatic trailer hitch assembly for use with a towing vehicle and a towed trailer or other towed vehicle having a metal-formed housing of the type having a forward ledge portion with a ball socket at its towing end, comprising:
(a) an elongated shank unit on the towed vehicle, said shank unit extending between leading and trailing ends and including:
(i) at the trailing end a ball member supported on a threaded stud secured to said trailing end and releasably coupled in the ball socket of said housing to support said trailing end therefrom;
(ii) at the leading end formed surfaces facilitating the guidance of said leading end when in contact with guide surfaces; and
(iii) a leveler assembly mounted on said trailing end comprising:
(aa) a plate member supported on and releasably secured to said trailing end, said trailing end of said shank unit and said plate member being provided with mating holes in which said ball member threaded stud is received and secured to secure both said ball member and said plate member on said shank structure; and
(bb) clamping means including a clamping member pivotally supported on and above said plate member and operative utilizing the weight of said shank unit extending outwardly from said ball member for grasping the forward ledge portion of said housing to support said elongated shank unit appropriately positioned for coupling to a receiving unit;
(b) a receiving unit on the towing vehicle having an entry wall portion formed for guiding said shank unit leading end and leading therefrom a tubular portion providing a bore for receiving a predetermined length of said shank unit; and
(c) spring-loaded locking means mounted on said receiving unit and having a first cocked position in which said locking means is held latched and sufficiently free of said bore to permit passage of said shank unit therein and an uncocked position in which said locking means is unlatched and freed for releasably locking said shank unit and tubular structure together, said shank unit and locking means being operatively associated such that entry of said shank unit into said bore acts to release said locking means from said cocked to said uncocked position.

2. A trailer hitch assembly as claimed in claim 1 including downwardly extending arm members formed as extension of said plate member for limiting lateral movement of said plate member on said trailing end.

3. A trailer hitch as claimed in claim 1 wherein said clamping member is adjustably positioned on said plate member enabling the relative angular relation of said ball socket housing and shank unit to be adjusted.

4. A trailer hitch assembly as claimed in claim 2 including upwardly extending laterally-spaced shaft support arm members formed as extensions of said plate member and a shaft supported on and extending between said support arms, said clamping member being supported on said shaft for pivoting about the axis thereof.

5. A trailer hitch assembly as claimed in claim 4 wherein said shaft includes an integral lever arm extending therefrom operative as a manual lever for bringing said clamping member into engagement with said ledge for supporting said shank unit therefrom prior to said shank unit entering said receiving unit and for automatically bringing said clamping member out of engagement with said ledge dependent upon said shank unit being supported by and coupled to said receiving unit.

6. A trailer hitch as claimed in claim 5 wherein said lever arm is formed to engage said receiving unit upon entry of said shank unit therein to rotate and thereby disengage said clamping member from said ledge.

7. An automatic trailer hitch assembly for use with a towing vehicle and a towed trailer or other towed vehicle having a metal-formed housing with a ball socket at its towing end, comprising:
 (a) an elongated shank unit on the towed vehicle, said shank unit extending between leading and trailing ends and including:
  (i) at the trailing end a ball member supported on a threaded stud secured to said trailing end and releasably coupled in the ball socket of said housing to support said trailing end therefrom;
  (ii) at the leading end formed surfaces facilitating the guidance of said leading end when in contact with guide surfaces; and
  (iii) a leveler assembly mounted on said trailing end including a clamping member pivotally supported on said trailing end forward of said ball member threaded stud and operative utilizing the weight of said shank unit extending outwardly from said ball member for grasping a selected forward portion of said housing to support said elongated shank unit appropriately positioned for coupling to a receiving unit;
 (b) a receiving unit on the towing vehicle having an entry wall portion formed for guiding said shank unit leading end and leading therefrom a tubular portion providing a bore for receiving a predetermined length of said shank unit; and
 (c) spring-loaded locking means mounted on said receiving unit and having a first cocked position in which said locking means is held latched and sufficiently free of said bore to permit passage of said shank unit therein and an uncocked position in which said locking means is unlatched and freed for releasably locking said shank unit and tubular structure together, said shank unit and locking means being operatively associated such that entry of said shank unit into said bore acts to release said locking means from said cocked to said uncocked position.

8. An automatic trailer hitch assembly as claimed in claim 7 wherein said housing is of the type having a forward ledge portion, said ledge portion comprises said selected forward portion and said clamping member is adapted to grasp said forward ledge portion.

9. An automatic trailer hitch as claimed in claim 7 wherein said clamping member is adjustably mounted on said trailing end enabling the relative angular relation of said ball socket housing and shank unit to be adjusted.

10. An automatic trailer hitch as claimed in claim 8 wherein said clamping member is adapted to automatically release its grasp of said selected forward portion upon said shank unit being received and supported by said receiving unit.

11. An automatic trailer hitch as claimed in claim 8 wherein said clamping member is pivotally supported for pivoting around the axis of a shaft which extends across said trailing end, resides in a plane substantially parallel to and below the plane of said ledge and is positioned substantially directly beneath the portion of said ledge engaged by said clamping member.

* * * * *

UNITED STATES PATENT AND TRADEMARK OFFICE
CERTIFICATE OF CORRECTION

PATENT NO. : 4,606,549

DATED : August 19, 1986

INVENTOR(S) : Thomas M. Williams, Jr.

It is certified that error appears in the above-identified patent and that said Letters Patent is hereby corrected as shown below:

Col. 4, line 1, delete the "."

Col. 4, line 1, delete "To" and substitute --to--

Col. 11. line 5, change "extension" to read --extensions--

Signed and Sealed this

Twenty-eighth Day of October, 1986

[SEAL]

*Attest:*

DONALD J. QUIGG

*Attesting Officer*   *Commissioner of Patents and Trademarks*